United States Patent
Hsiao et al.

(10) Patent No.: US 9,547,386 B2
(45) Date of Patent: Jan. 17, 2017

(54) TOUCH PROJECTION SYSTEM

(71) Applicants: QISDA OPTRONICS (SUZHOU) CO., LTD., Suzhou, Jiangsu Province (CN); QISDA CORPORATION, Taoyuan County (TW)

(72) Inventors: Chi-Hung Hsiao, Taoyuan County (TW); Ying-Fang Lin, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 0 days.

(21) Appl. No.: 14/580,232

(22) Filed: Dec. 23, 2014

(65) Prior Publication Data
US 2015/0177911 A1    Jun. 25, 2015

(30) Foreign Application Priority Data
Dec. 24, 2013 (TW) ............................... 102147988 A (51) Int. Cl.
*G06F 3/041* (2006.01)
*G06F 3/042* (2006.01)
*G02B 26/08* (2006.01)

(52) U.S. Cl.
CPC ......... *G06F 3/0412* (2013.01); *G02B 26/0833* (2013.01); *G06F 3/0425* (2013.01); *G06F 3/0426* (2013.01)

(58) Field of Classification Search
CPC ...... G06F 3/042; G06F 3/0421; G06F 3/0423; G06F 3/0425; G06F 3/0426; G06F 3/0412; G02B 26/0841; G02B 26/0833; G02B 27/18; G09G 3/346; G03B 21/008; G03B 21/10
See application file for complete search history.

(56) References Cited

U.S. PATENT DOCUMENTS

| | | | | |
|---|---|---|---|---|
| 5,831,601 A * | 11/1998 | Vogeley | ................. | G09G 3/346 345/175 |
| 7,835,062 B2 * | 11/2010 | Ishii | .................... | G02B 26/0833 359/224.1 |
| 2002/0122159 A1 * | 9/2002 | Choi | ................... | G02B 26/0841 353/31 |
| 2007/0263174 A1 * | 11/2007 | Shyu | ..................... | G06F 3/0421 353/34 |

(Continued)

*Primary Examiner* — Dwayne Bost
*Assistant Examiner* — Ivelisse Martinez Quiles (57) ABSTRACT

A touch projection system includes a light source device, a micromirror device, and an image-capturing device. The micromirror device can provide three reflection directions. The micromirror device can selectively reflect projection light emitted by the light source device in one of the reflection directions to project the reflected projection light onto a screen to form an image. The micromirror device also can reflect image light from the screen in another one of the reflection directions. Further, the micromirror device can reflect the image light from the screen in the other one of the reflection directions, which has a larger deflection angle, to be received by the image-capturing device, for example for determining a touch operation performed on the screen. Thereby, the limitation of structural interference by other components to the image-capturing device is reduced, so that the touch projection system can be assembled in a compact configuration.

12 Claims, 9 Drawing Sheets

(56) References Cited

U.S. PATENT DOCUMENTS

| | | | |
|---|---|---|---|
| 2010/0110024 A1* | 5/2010 | Kim | G06F 3/042 345/173 |
| 2011/0058084 A1* | 3/2011 | Hine | G06F 3/017 348/333.1 |
| 2014/0091200 A1* | 4/2014 | Cheng | G06F 3/0423 250/206.1 |

* cited by examiner

TOUCH PROJECTION SYSTEM

BACKGROUND OF THE INVENTION

1. Field of the Invention

The invention relates to a projection system, and especially relates to a touch projection system.

2. Description of the Prior Art

Recently, touch applications develop rapidly. Some kinds of projectors are designed to cooperate with touch technology. Common touch technology at present is to form an infrared light curtain in front of a screen. A receiving module is added into a projector for receiving image light produced by the infrared light curtain, so that a touch operation of a user can be determined by analyzing an image of the user interrupting the infrared light curtain. In practice, the receiving module can be integrated with a projection lens of the projector. The image light enters the projector through the projection lens and is reflected by a micromirror device (e.g. a digital micromirror device, DMD) to an image-capturing device. In this case, the micromirror device performs the function of modulating (e.g. selectively reflecting) light produced by a light source device of the projector and projecting the modulated light onto the screen to form images, and also the function of reflecting the image light, which enters the projector, to be received by the image-capturing device. The micromirror of a common digital micromirror device usually offers two states. One is defined as ON state, at which the micromirror reflects light to be projected toward the screen by the projection lens. The other is defined as OFF state, at which the micromirror reflects light to deflect off the projection lens so that the light is prevented from being projected onto the screen. In general, the micromirror rotates relative to a single axis to offers the ON state and the OFF state based on the limit positions of positive rotation and negative rotation. Thereby, the components of the projector can be disposed with less structural interference and operate normally. Therefore, the micromirror device uses the OFF state to reflect the image light to the image-capturing device. However, the rotation angle of the micromirror is restricted so that it is hard to configure the components of the projector compactly leading to incapability of effectively reducing the volume of the projector.

SUMMARY OF THE INVENTION

An objective of the invention is to provide a touch projection system. Its micromirror device can offer more reflection directions so that its image-capturing device can be disposed conveniently and the components of the touch projection system also can be disposed compactly.

The touch projection system of the invention includes a screen, a light source device, an image-capturing device, and a micromirror device. The light source device is used for emitting projection light. The image-capturing device is used for receiving image light from the screen. The micromirror device is used for reflecting the projection light and the image light. The micromirror device includes a plurality of micromirrors arranged in an array. The micromirror is controllable to be selectively located at a first angled position, a second angled position, or a third angled position. The micromirror has a first normal direction, a second normal direction, and a third normal direction corresponding to the first angled position, the second angled position, and the third angled position respectively. Therein, when the micromirror is located at the first angled position, the projection light from the light source device is reflected by the micromirror and travels in a first reflection direction to be projected onto the screen. When the micromirror is located at the second angled position, the image light from the screen travels to the micromirror in a reverse direction reverse to the first reflection direction, is reflected by the micromirror, and travels in a second reflection direction. The second reflection direction and the first reflection direction are nonparallel. When the micromirror is located at the third angled position, the image light from the screen travels to the micromirror in the reverse direction, is reflected by the micromirror, and travels in a third reflection direction to be received by the image-capturing device. The third reflection direction is nonparallel to the first reflection direction and the second reflection direction.

Compared with the prior art, the micromirror device of the touch projection system of the invention offers more reflection directions to the image light from the screen, so that the disposition of the image-capturing device is more flexible. In practice, the image-capturing device usually is disposed to receive the reflected image light much deflecting off the projection direction (i.e. the first reflection direction) for the projection light. For example, an included angle between the third reflection direction and the first reflection direction is larger than an included angle between the second reflection direction and the first reflection direction, so that the image-capturing device can obtain a larger disposition space. In other words, the light source device, the image-capturing device, and the micromirror device can be disposed compactly. In practice, the light source device, the image-capturing device, and the micromirror device are usually integrated in a projector casing. In the case, the projector casing can be smaller than the conventional touch projector. In addition, in practice, the micromirror of the invention can perform the above angled positions by a rotation mechanism of single axis or multiple axes.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
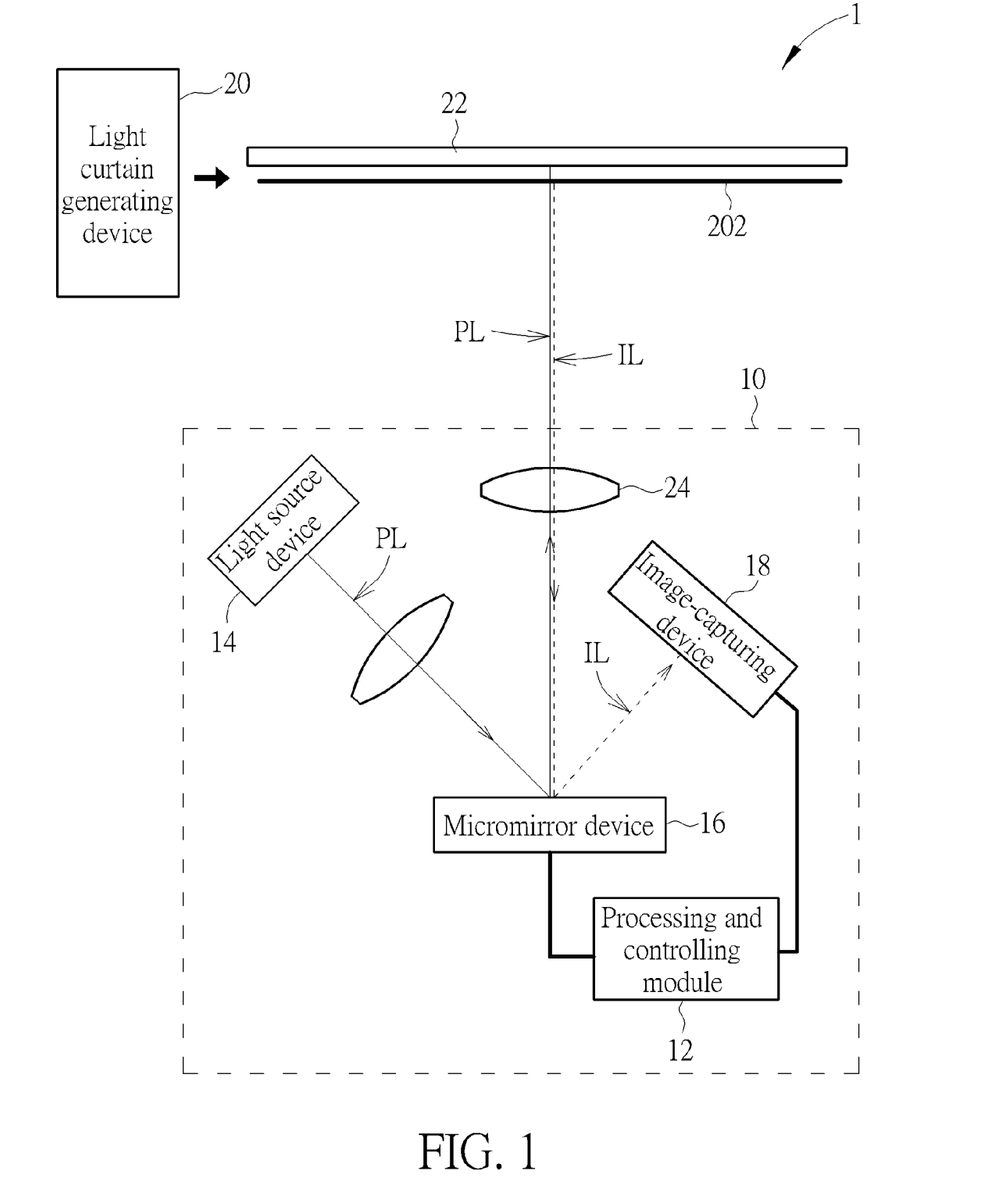
FIG. 1 is a schematic diagram illustrating a touch projection system of a preferred embodiment according to the invention.

Please refer to FIG. 1, which is a schematic diagram illustrating a touch projection system 1 of a preferred embodiment according to the invention. The touch projection system 1 includes a processing and controlling module 12, a light source device 14, a micromirror device 16, an image-capturing device 18, a light curtain generating device 20, a screen 22, and a lens 24. The processing and controlling module 12 is electrically connected to the light source device 14, the micromirror device 16, and the image-capturing device 18 individually. The processing and controlling module 12 controls the light source device 14 to emit projection light PL (represented by solid lines with arrows in FIG. 1), controls the micromirror device 16 to selectively reflect the projection light PL from the light source device 14 and reflect image light IL (represented by dashed lines with arrows in FIG. 1) from the screen 22, and controls the image-capturing device 18 to receive the image light IL from the screen 22. The light curtain generating device 20 generates a light curtain 202 in front of the screen 22. The image light IL is produced by the light curtain 202. In the embodiment, the processing and controlling module 12, the light source device 14, the micromirror device 16, and the image-capturing device 18 are integrated into a projector casing 10 (represented by a dashed rectangle in FIG. 1); however, the invention is not limited thereto.

Figure 2:
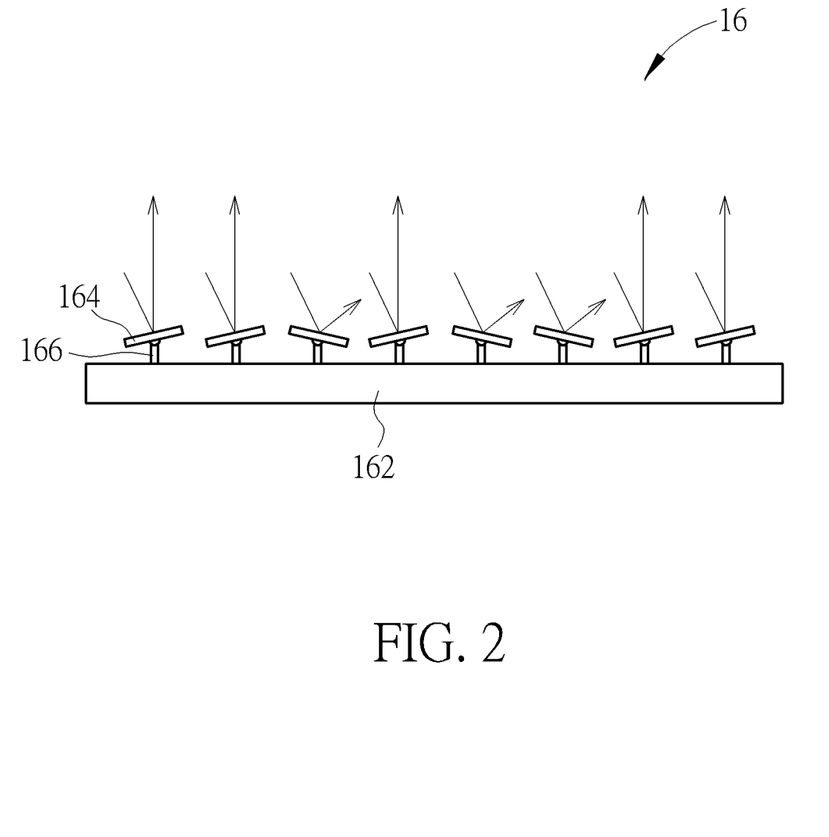
FIG. 2 is a schematic diagram illustrating the side view of a micromirror device of the touch projection system in FIG. 1.

Please also refer to FIG. 2. FIG. 2 is a schematic diagram illustrating the side view of the micromirror device 16. The micromirror device 16 includes a base 162, a plurality of micromirrors 164, and a plurality of rotation mechanisms 166 correspondingly to the plurality of micromirrors 164. The rotation mechanisms 166 are disposed on the base 162. Each micromirror 164 is rotatably disposed on the base 162 through the corresponding rotation mechanism 166. The micromirrors 164 are arranged in an array. The processing and controlling module 12 controls the operation of the rotation mechanisms 166 so that the micromirrors 164 can selectively reflect the projection light PL to pass through the lens 24 to be projected onto the screen 22 (i.e. the light traveling upward in FIG. 2) to form a projection image. Please refer to FIG. 3, which is a schematic diagram illustrating the operation of the micromirror 164. The rotation mechanism 166 is connected to the corresponding micromirror 164 so that the rotation mechanism 166 can control the corresponding micromirror 164 to rotate relative to a rotation axis 164a (represented by a cross mark in FIG. 3) to be selectively located at a first angled position P1 (shown by solid lines in FIG. 3), a second angled position P2 (indicated by dashed lines in FIG. 3), or a third angled position P3 (indicated by dashed lines in FIG. 3). In other words, the micromirror 164 is controllable to be selectively located at the first angled position P1, the second angled position P2, or the third angled position P3. The micromirror 164 has a first normal direction N1, a second normal direction N2, and a third normal direction N3 corresponding to the first angled position P1, the second angled position P2, and the third angled position P3. In the embodiment, the first normal direction N1, the second normal direction N2, and the third normal direction N3 are coplanar. The rotation axis 164a is perpendicular to the first normal direction N1 and the second normal direction N2. It is added that, in the specification and figures, the rotation mechanism 166 is illustrated only by a single support that offers the corresponding micromirror 164 pivot or deflection relative to the base 162, and the position of the rotation axis 164a is indicated conceptually by the cross mark. In practice, the rotation mechanism 166 can be realized through an electromechanical integration design, for example based on a common DMD, of which the operation detail is easily obtained and understood by people in the field of the invention and will not be described in addition. However, the invention is not limited thereto.

Figure 3:
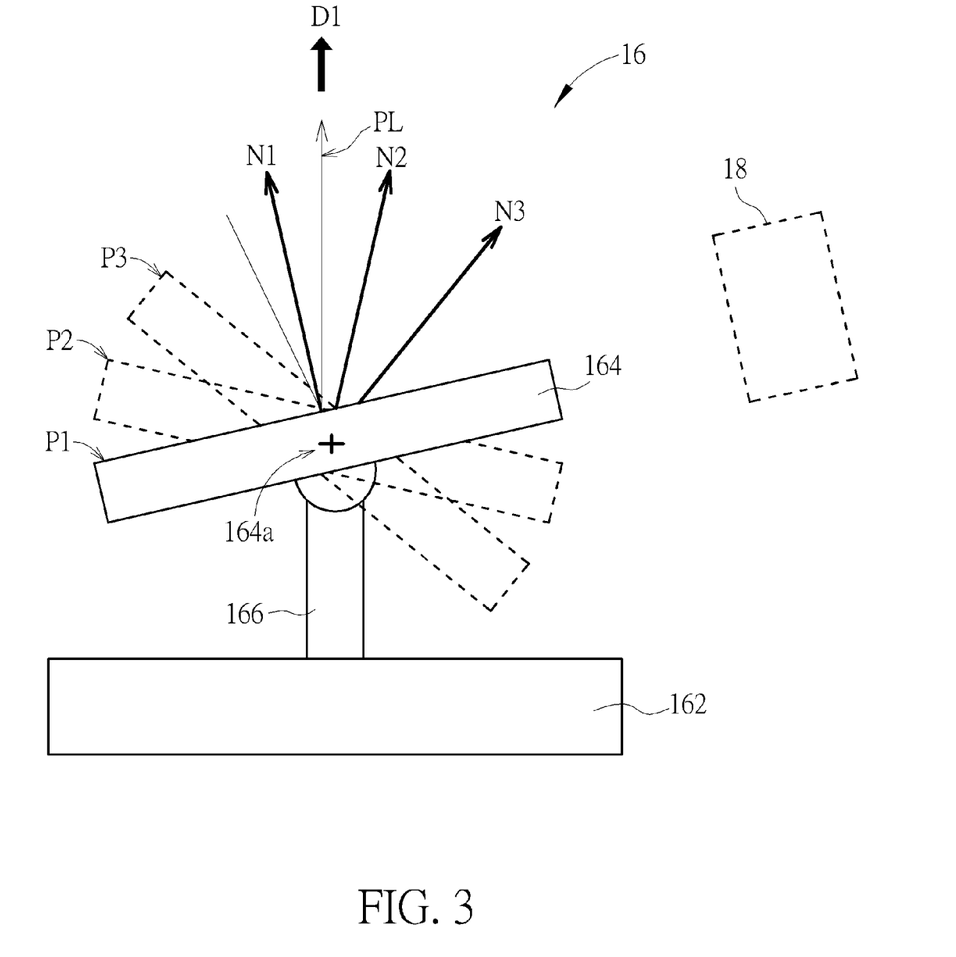
FIG. 3 is a schematic diagram illustrating the operation of a micromirror of the micromirror device in FIG. 2.

Please refer to FIG. 1 and FIG. 3. When the micromirror 164 is located at the first angled position P1, the projection light PL from the light source device 14 is reflected by the micromirror 164 and travels in a first reflection direction D1 to be projected onto the screen 22, as represented by a solid line with an arrow in FIG. 3. At the moment, the state at which the micromirror 164 is located at the first angled position P1 can be defined as an ON state, that is, for projecting the projection light PL to form a projection image. At this state, the image light IL (not shown in FIG. 3) will pass through the lens 24 to enter the projector casing 10 in a reverse direction along the projection path of the projection light PL, so the image light IL will not travel toward the image-capturing device 18 (represented by a dashed rectangle in FIG. 3); the image-capturing device 18 cannot capture the touch image produced by the light curtain 202. It is added that in general, because the light curtain 202 is usually formed by invisible light, e.g. infrared, the image light IL into the projector casing 10 will not affect the projection image formed by the projection light PL even though the image light IL travels in the reverse direction along the projection path of the projection light PL. But the invention is still not limited thereto. For example, a filter can be disposed between the light source device 14 and the micromirror device 16 so that the image light IL can be filtered out.

Figure 4:
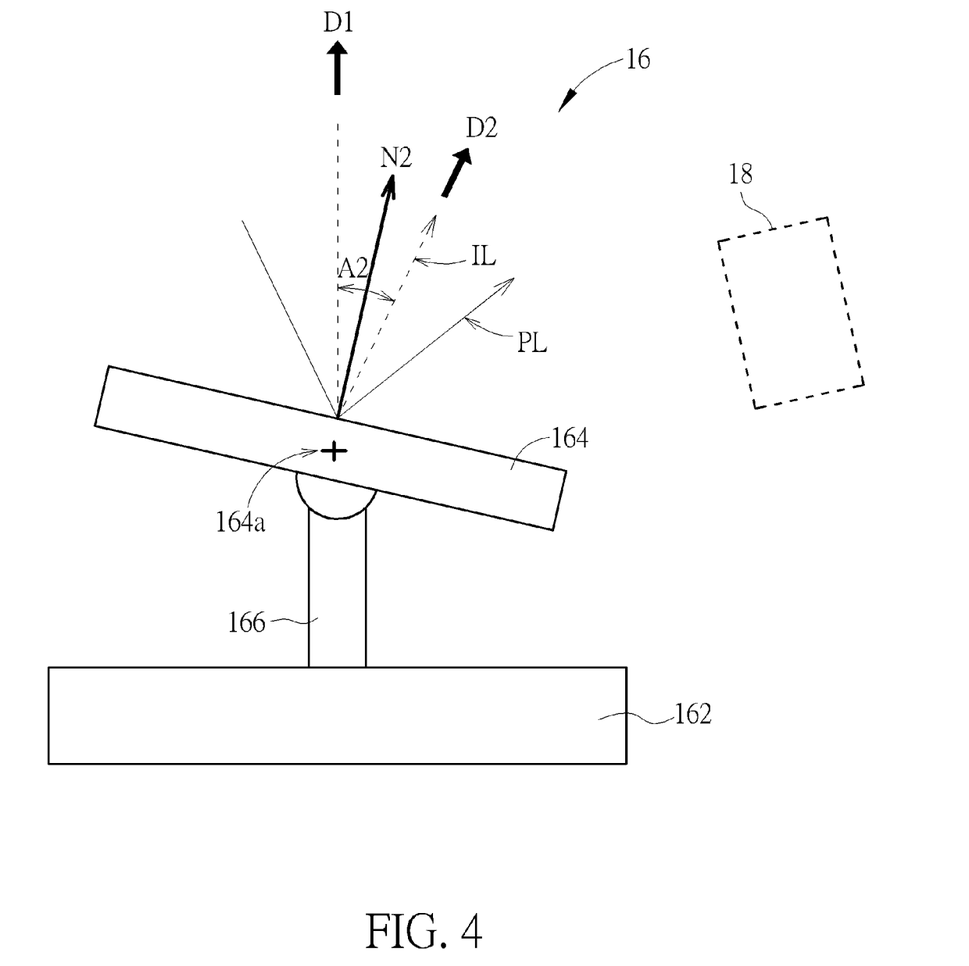
FIG. 4 is a schematic diagram illustrating the micromirror in FIG. 3 located at a second angled position.

Please also refer to FIG. 4. FIG. 4 is a schematic diagram illustrating the micromirror 164 at the second angled position P2. When the micromirror 164 is located at the second angled position P2, the image light IL from the screen 22 travels to the micromirror 164 in a reverse direction reverse to the first reflection direction D1, is reflected by the micromirror 164, and travels in a second reflection direction D2, as represented by a dashed line with an arrow in FIG. 4. Therein, the second reflection direction D2 and the first reflection direction D1 are nonparallel (i.e. a non-zero included angle therebetween exists). After reflected by the micromirror 164, the projection light PL from the light source device 14 travels deflecting off the first reflection direction D1, also deflecting off the second reflection direction D2. Therefore, the reflected projection light PL will not be projected onto the screen 22, as represented by a solid line with an arrow in FIG. 4. At the moment, the state at which the micromirror 164 is located at the second angled position P2 can be defined as an OFF state, that is, for preventing the reflected projection light PL from forming a projection image. In the embodiment, the image light IL reflected to travel in the second reflection direction D2 is not toward the image-capturing device 18 (represented by a dashed rectangle in FIG. 4), so the image-capturing device 18 cannot capture the touch image produced by the light curtain 202. Furthermore, the image-capturing device 18 is usually designed to be capable of only receiving the image light IL, e.g. infrared. In general, the projection light PL is visible light, so it will not be received by the image-capturing device 18. However, in practice, for avoiding unnecessary interference, for example in a case that the image-capturing device 18 cannot receive infrared only or the projection light PL may contain little infrared, the second angled position P1 can be designed such that the projection light PL will not travel to the image-capturing device 18 after reflected by the micromirror 164.

Figure 5:
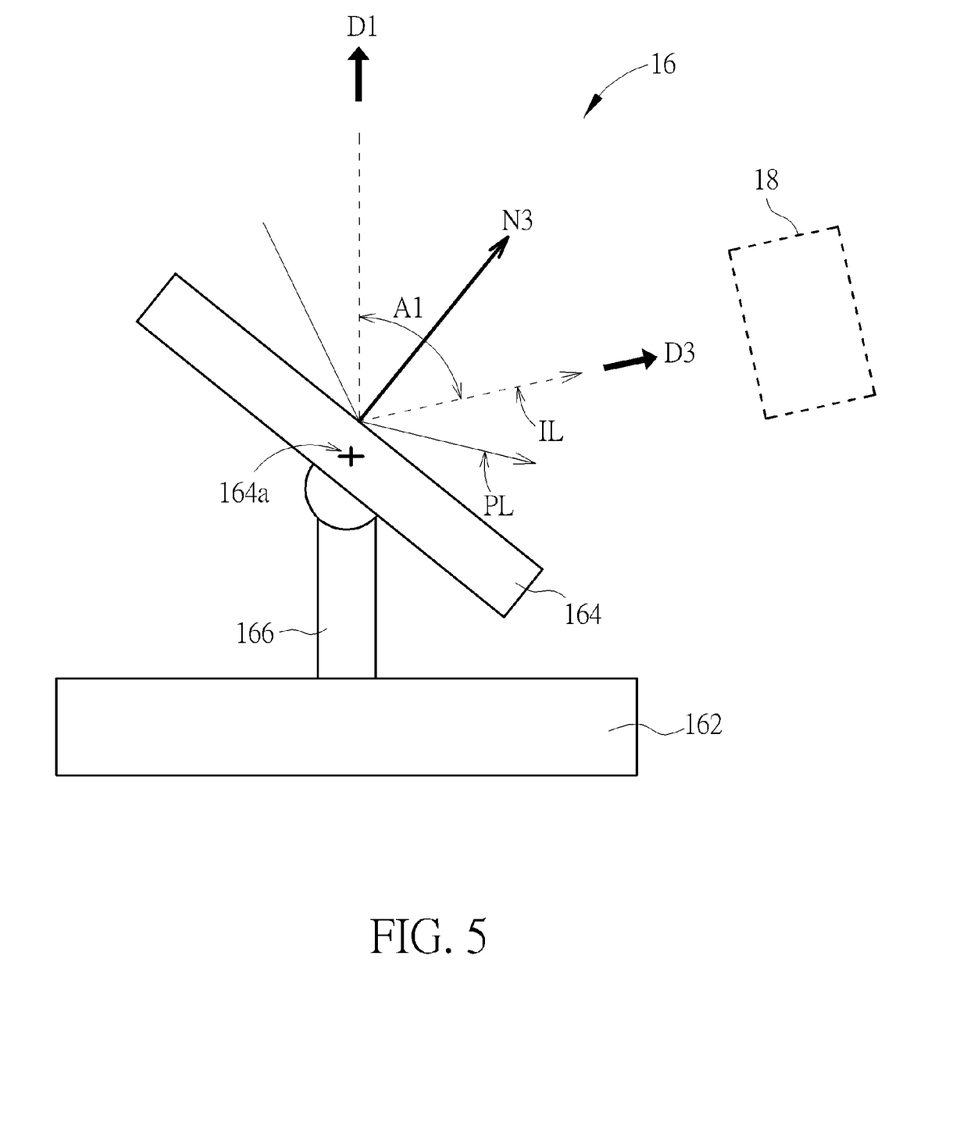
FIG. 5 is a schematic diagram illustrating the micromirror in FIG. 3 located at a third angled position.

Please also refer to FIG. 5. FIG. 5 is a schematic diagram illustrating the micromirror 164 at the third angled position P3. When the micromirror 164 is located at the third angled position P3, the image light IL from the screen 22 travels to the micromirror 164 in the reverse direction (i.e. reverse to the first reflection direction D1), is reflected by the micromirror 164, and travels in a third reflection direction D3 to be received by the image-capturing device 18 (represented by a dashed rectangle in FIG. 5), as represented by a dashed line with an arrow in FIG. 5. Therein, the third reflection direction D3 is nonparallel to the first reflection direction D1 and the second reflection direction D2. At the moment, after reflected by the micromirror 164, the projection light PL from the light source device 14 travels deflecting off the first reflection direction D1, also deflecting off the second reflection direction D2 and the third reflection direction D3. Therefore, he reflected projection light PL will not be projected onto the screen 22, as represented by a solid line with an arrow in FIG. 5. At the moment, the state at which the micromirror 164 is located at the third angled position P3 can be defined as a CAMERA state; that is, the processing and controlling module 12 can control the image-capturing device 18 to receive the image light IL to form a touch image and analyze the touch image to determine a touch operation. Therein, the reflected projection light PL cannot form a projection image. Afterward, the processing and controlling module 12 can control the micromirror device 16 to project the projection light PL onto to the screen 22 to form a projection image in response to the touch operation (e.g. a user touches an object or points a cursor position). In the embodiment, an included angle A1 between the third reflection direction D3 and the first reflection direction D1 is larger than an included angle A2 between the second reflection direction D2 and the first reflection direction D1 (referring to FIG. 4). Therefore, the included angle A1 allows disposing the image-capturing device 18 and other components (e.g. prism) in a compact configuration. In another aspect, the projector casing 10 can be provided with a smaller volume.

Figure 6:
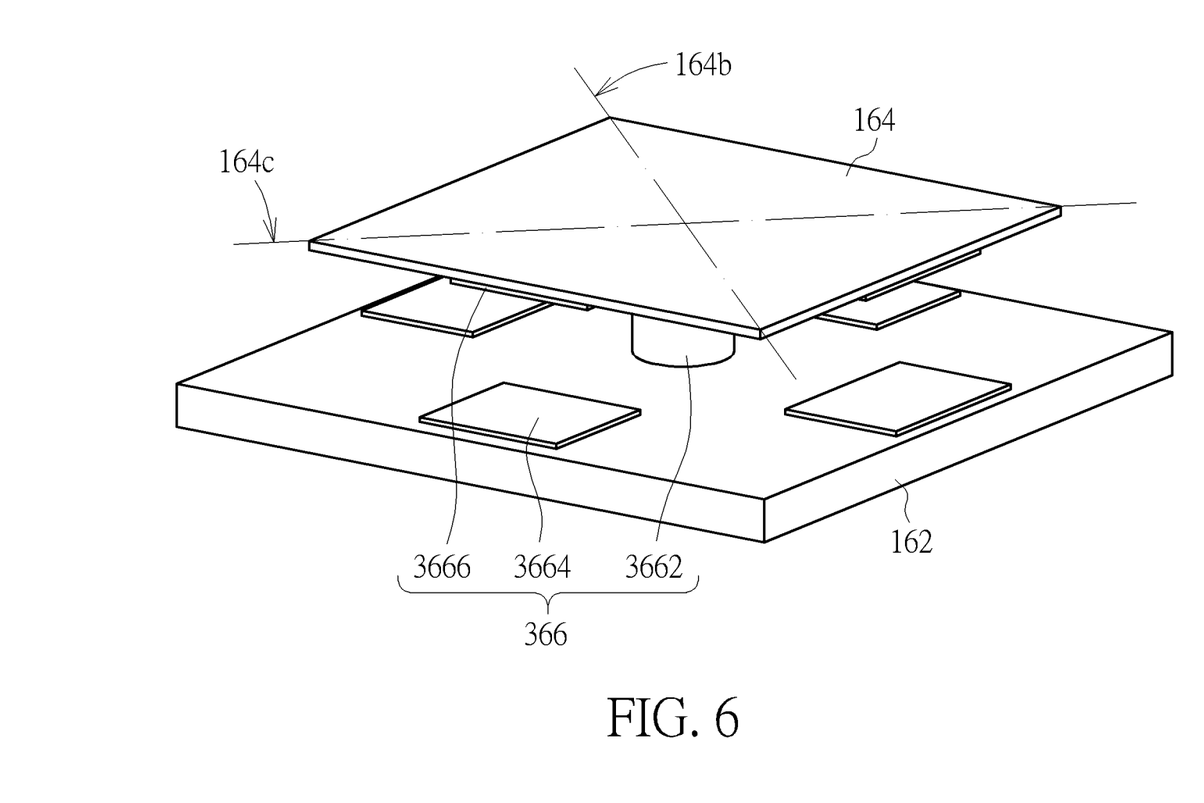
FIG. 6 is a schematic diagram illustrating a rotation mechanism rotating the micromirror in a micromirror device according to an embodiment.

In the above embodiment, the rotation mechanism 166 is realized by a rotation mechanism of single rotation axis for offering only one-dimensional rotation; however, the invention is not limited thereto. Please refer to FIG. 6, which is a schematic diagram illustrating a rotation mechanism 366 rotating the micromirror 164 in a micromirror device according to an embodiment. The micromirror device of this embodiment is similar to the micromirror device 16 of above embodiment, so other descriptions of the micromirror device of this embodiment can refer to the relational descriptions of micromirror device 16 and will not be described in addition. The difference between the micromirror device of this embodiment and the micromirror device 16 of above embodiment is mainly that the rotation mechanism 366 can offer two-dimensional rotation. In the embodiment, in logic, the rotation mechanism 366 includes a flexible support 3662 (or a mechanism capable of deflecting the micromirror 164 relative to the base 162), four electrode pads 3664 disposed on the base 162, and four electrostatic zones 3666 disposed on the surface of the micromirror 164 toward the base 162. The four electrostatic zones 3666 correspond to the four electrode pads 3664. The flexible support 3662 is capable of being applied with a force (or moment) to be bent or deflect the micromirror 164 relative to the base 162. In the embodiment, by applying voltage to the electrode pad 3664 so that an attraction force or repulsion force is produced between the electrode pad 3664 and the corresponding electrostatic zone 3666, the micromirror 164 can deflect relative to the base 162. In logic, the interaction of the four electrode pads 3664 with the four corresponding electrostatic zones 3666 can move the micromirror 164 as the micromirror 164 rotates relative to two axes. Therefore, the micromirror 164 has at least four states (i.e. four angled positions) in principle.

Figure 7:
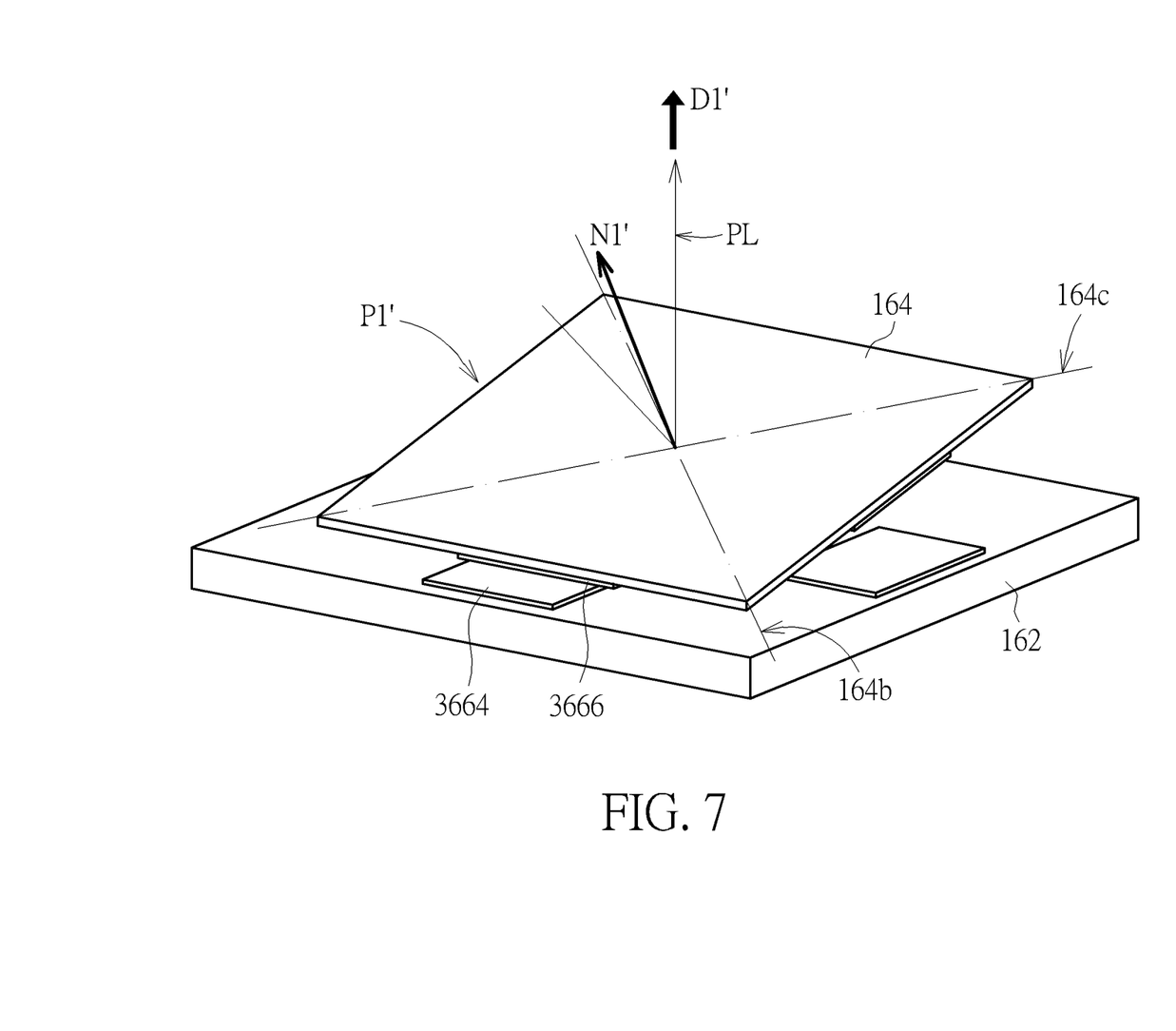
FIG. 7 is a schematic diagram illustrating the micromirror in FIG. 6 located at a first angled position.
Figure 8:
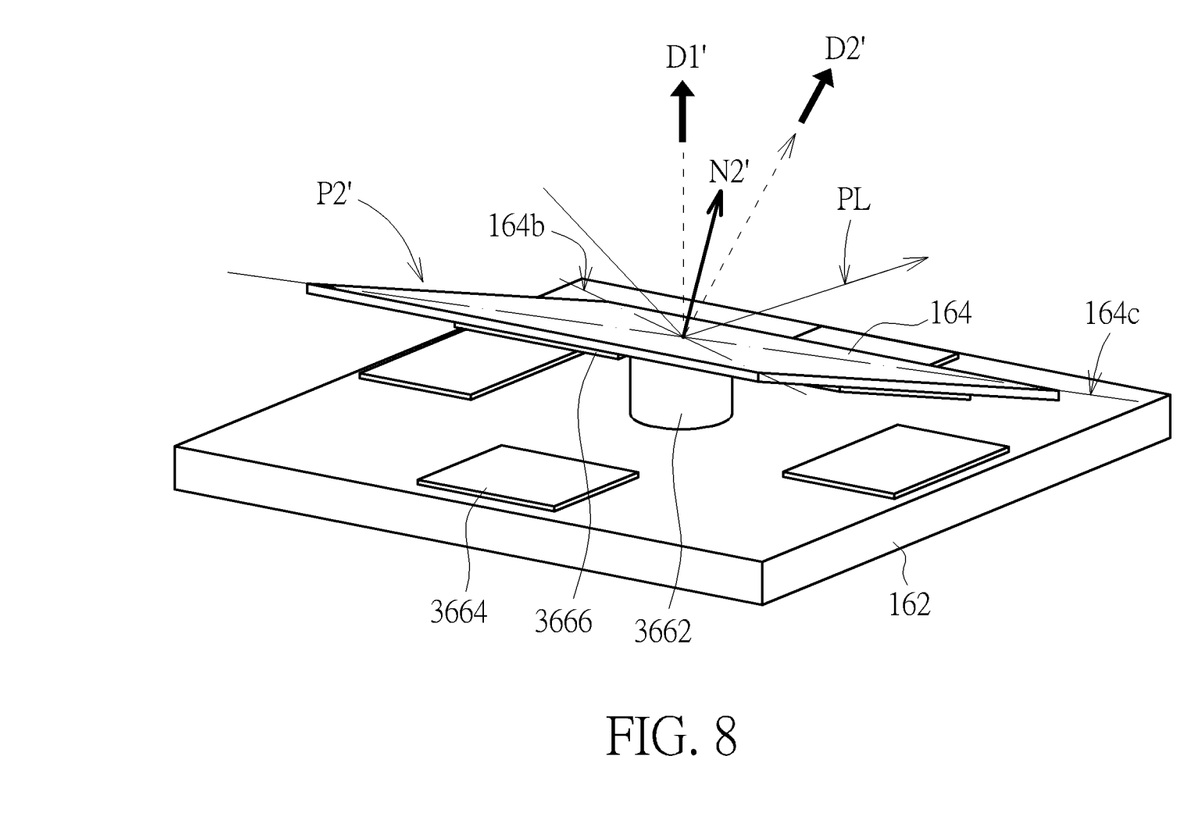
FIG. 8 is a schematic diagram illustrating the micromirror in FIG. 6 located at a second angled position.
Figure 9:
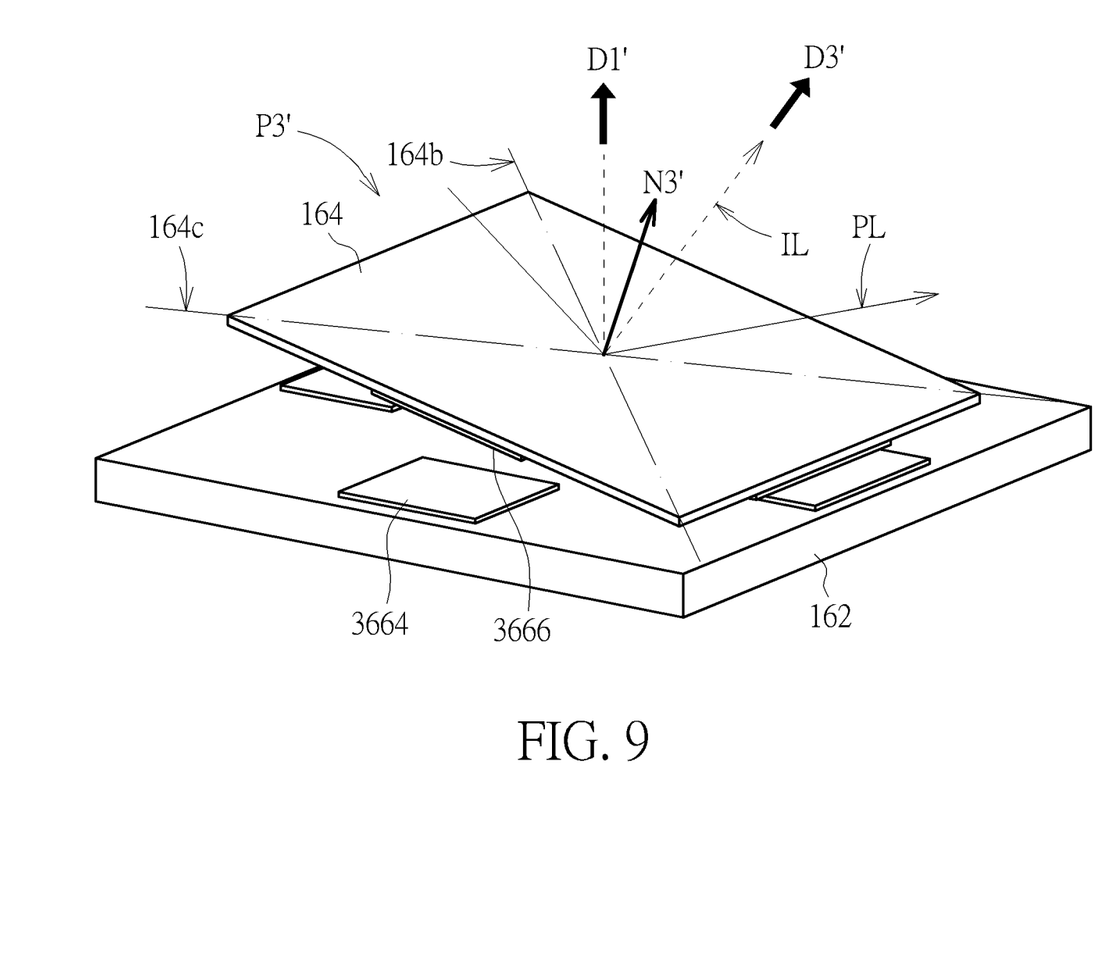
FIG. 9 is a schematic diagram illustrating the micromirror in FIG. 6 located at a third angled position.

Please refer to FIG. 1 and FIGS. 6 to 9. FIGS. 7 to 9 are schematic diagrams illustrating the micromirror 164 being located at a first angled position P1', a second angled position P2', and a third angled position P3' respectively. The rotation mechanism 366 is connected to the corresponding micromirror 164 so that the rotation mechanism 366 can control the micromirror 164 to rotate relative to a first rotation axis 164b and a second rotation axis 164c (shown by chain lines in FIGS. 6 to 9) to be selectively located at the first angled position P1', the second angled position P2', and the third angled position P3'. As shown by FIG. 7, the micromirror 164 is located at the first angled position P1'. The projection light PL from the light source device 14 is reflected by the micromirror 164 and travels in a first reflection direction D1' to be projected onto the screen 22, as represented by a solid lines with an arrow in FIG. 7. At the moment, the state at which the micromirror 164 is located at the first angled position P1' can be defined as an ON state, that is, for projecting the projection light PL to form a projection image. At this state, the image light IL (not shown in FIG. 7) will enters the projector casing 10 in a reverse direction along the projection path of the projection light PL, so the image light IL will not travel toward the image-capturing device 18 so that the image-capturing device 18 cannot capture the touch image formed by the light curtain 202. Therein, for a simple drawing, the image-capturing device 18 is not shown in the figure, which is also applied in the following and will not be mentioned in addition.

When the micromirror 164 is controlled by the corresponding rotation mechanism 366 so that the micromirror 164 rotates relative to the first rotation axis 164b and the second rotation axis 164c individually from the first angled position P1' (as shown by FIG. 7) to the second angled position P2' (as shown by FIG. 8), the image light IL from the screen 22 travels to micromirror 164 in a reverse direction reverse to the first reflection direction D1', is reflected by the micromirror 164, and travels in a second reflection direction D2', as represented by a dashed line with an arrow in FIG. 8. Therein, the second reflection direction D2' and the first reflection direction D1' are nonparallel. After reflected by the micromirror 164, the projection light PL from the light source device 14 travels deflecting off the first reflection direction D1', also deflecting off the second reflection direction D2'. Therefore, the reflected projection light PL will not be projected onto the screen 22, as represented by a solid line with an arrow in FIG. 8. At the moment, the state at which the micromirror 164 is located at the second angled position P2' can be defined as an OFF state, that is, for preventing the reflected projection light PL from forming a projection image. In the embodiment, the image light IL reflected to travel in the second reflection direction D2' is not toward the image-capturing device 18 (referring to FIG. 4 for the traveling path thereof), so the image-capturing device 18 cannot capture the touch image produced by the light curtain 202.

When the micromirror 164 is controlled by the corresponding rotation mechanism 366 so that the micromirror 164 rotates relative to the first rotation axis 164b from the first angled position P1' (as shown by FIG. 7) to the third angled position P3' (as shown by FIG. 9), the image light IL from the screen 22 travels to micromirror 164 in the reverse direction reverse to the first reflection direction D1', is reflected by the micromirror 164, and travels in a third reflection direction D3' to be received by the image-capturing device 18, as represented by a dashed line with an arrow in FIG. 9. Therein, the third reflection direction D3' and the first reflection direction D1' are nonparallel. Furthermore, for a simple drawing, the image-capturing device 18 is not shown in FIG. 9; the logic of receiving the image light IL is the same as shown by FIG. 5. After reflected by the micromirror 164, the projection light PL from the light source device 14 travels deflecting off the first reflection direction D1', also deflecting off the third reflection direction D3'. Therefore, the reflected projection light PL will not be projected onto the screen 22, as represented by a solid line with an arrow in FIG. 9. At the moment, the state at which the micromirror 164 is located at the third angled position P3' can be defined as a CAMERA state; that is, the processing and controlling module 12 can control the image-capturing device 18 to receive the image light IL to form a touch image and analyze the touch image to determine a touch operation. Therein, the reflected projection light PL cannot form a projection image. Afterward, the processing and controlling module 12 can control the micromirror device 16 to project the projection light PL onto to the screen 22 to form a projection image in response to the touch operation (e.g. a user touches an object or points a cursor position).

It is added that in the embodiment, the micromirror 164 uses the two rotation axes 164b and 164c to change its current state. Therefore, as a whole, the four angled positions (including the above angled positions P1', P2' and P3') of the micromirror 164 are switched to one another in stereo. In other words, the normal directions N1', N2' and N3' of the micromirror 164 corresponding to the angled positions P1', P2' and P3' respectively are noncoplanar; the reflection directions D1', D2' and D3' are also noncoplanar. Therefore, in principle, except for the ON state, any state at which the micromirror 164 is located can be defined as an OFF state, and the CAMERA state can be assigned to one of the rest states. The image-capturing device 18 is disposed according to the assignment of the CAMERA state. For example, the state at which the micromirror 164 is located in FIG. 7 is still defined as the first angled position (i.e. the ON state). However, the state at which the micromirror 164 is located in FIG. 9 is defined as the second angled position (i.e. the OFF state); the state at which the micromirror 164 is located in FIG. 8 is defined as the third angled position (i.e. the CAMERA state). In other words, the micromirror 164 can be controlled by the corresponding rotation mechanism 366 so that the micromirror 164 rotates relative to the first rotation axis 164b from the first angled position (as shown by FIG. 7) to the second angled position (as shown by FIG. 9); the micromirror 164 can be controlled by the corresponding rotation mechanism 366 so that the micromirror 164 rotates relative to the first rotation axis 164b and the second rotation axis 164c from the first angled position (as shown by FIG. 7) to the third angled position (as shown by FIG. 8).

Furthermore, the four angled positions (including the above angled positions P1', P2' and P3') of the micromirror 164 are switched to one another in stereo, which is conducive to flexibly, further compactly disposing the components inside the projector casing 10 of the touch projection system 1. In addition, in the embodiment, a rotation angle (e.g. the included angle between the normal directions N1' and N2') of the micromirror 164 rotating relative to the rotation axes 164b and 164c is substantially equal to the double of a square root of a rotation angle (e.g. the included angle between the normal directions N1' and N3') of the micromirror 164 rotating relative to the rotation axis 164b or 164c.

In other words, even though the rotation angle offered alone by the rotation axis 164b or 164c is substantially equal to that offered by the micromirror of a conventional DMD, the micromirror 164 still can obtain a larger variation of rotation angle by rotating relative to both of the rotation axes 164b and 164c. Such design is conducive to flexibly disposing the components in the projector casing 10 and also facilitates the disposition of the components.

As discussed above, the micromirror device of the touch projection system of the invention offers more reflection directions to the image light from the screen, so that the image-capturing device can obtain a larger disposition space and can be disposed more flexibly. In other words, the light source device, the image-capturing device, and the micromirror device can be compactly disposed, so that the volume of the projector casing is smaller than conventional touch projectors. In addition, the micromirror device of touch projection system of the invention can control the rotation of the micromirror by use of multiple rotation axes so as to diversify the angled positions for the micromirror. The switching of the micromirror from one to another of the angled positions shows a three-dimensional switching, which is conducive to the flexibility of the disposition of the components.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A touch projection system, comprising:
a screen;
a micromirror device, the micromirror device comprising a base and a plurality of micromirrors arranged in an array on the base;
a light source disposed toward the micromirror device;
an image capturer disposed toward the micromirror device; and
a processor, electrically connected to the micromirror device, the light source, and the image capturer, the processor controlling the light source to emit projection light, the processor controlling the micromirror to be selectively located at a first angled position, a second angled position, or a third angled position, the micromirror having a first normal direction, a second normal direction, and a third normal direction corresponding to the first angled position, the second angled position, and the third angled position, the processor controlling the image capturer to receive image light from the screen;
wherein, when the micromirror is located at the first angled position, the projection light from the light source is reflected by the micromirror and travels in a first reflection direction to be projected onto the screen;
when the micromirror is located at the second angled position, the image light from the screen travels to the micromirror in a reverse direction reverse to the first reflection direction, is reflected by the micromirror, and travels in a second reflection direction, and the second reflection direction and the first reflection direction are nonparallel; and
when the micromirror is located at the third angled position, the image light from the screen travels to the micromirror in the reverse direction, is reflected by the micromirror, and travels in a third reflection direction to be received by the image capturer, and the third reflection direction is nonparallel to the first reflection direction and the second reflection direction.

2. The touch projection system of claim 1, wherein the first normal direction, the second normal direction, the third normal direction, and the first reflection direction are coplanar, and an included angle between the third reflection direction and the first reflection direction is larger than an included angle between the second reflection direction and the first reflection direction.

3. The touch projection system of claim 2, wherein the micromirror device comprises a plurality of rotation mechanisms corresponding to the plurality of micromirrors, the rotation mechanism is connected to the base and the corresponding micromirror so that the rotation mechanism controls the corresponding micromirror to rotate relative to a rotation axis to be selectively located at the first angled position, the second angled position, or the third angled position, and the rotation axis is perpendicular to the first normal direction and the second normal direction.

4. The touch projection system of claim 1, wherein the first reflection direction, the second reflection direction, and the third reflection direction are noncoplanar.

5. The touch projection system of claim 4, wherein the micromirror device comprises a plurality of rotation mechanisms corresponding to the plurality of micromirrors, and the rotation mechanism is connected to the corresponding micromirror so that the rotation mechanism controls the corresponding micromirror to rotate relative to a first rotation axis and a second rotation axis to be selectively located at the first angled position, the second angled position, or the third angled position.

6. The touch projection system of claim 5, wherein the rotation mechanism controls the corresponding micromirror to rotate relative to the first rotation axis and the second rotation axis individually from the first angled position to the second angled position, and the rotation mechanism controls the corresponding micromirror to rotate relative to the first rotation axis from the first angled position to the third angled position.

7. The touch projection system of claim 5, wherein the rotation mechanism controls the corresponding micromirror to rotate relative to the first rotation axis and the second rotation axis individually from the first angled position to the third angled position.

8. The touch projection system of claim 1, further comprising a light curtain generator for generating a light curtain in front of the screen, wherein the image light is produced by the light curtain.

9. The touch projection system of claim 1, the processor controlling the image capturer to receive the image light to form a touch image and analyzing the touch image to determine a touch operation, the processor controlling the micromirror device to project the projection light onto to the screen to form a projection image in response to the touch operation.

10. The touch projection system of claim 1, further comprising a light curtain generator for producing a light curtain in front of the screen, wherein the image light is produced by the light curtain.

11. The touch projection system of claim 1, further comprising a lens, wherein the projection light traveling in the first reflection direction passes through the lens to be projected onto the screen, and the image light from the screen passes through the lens to be reflected by the micromirror device.

12. The touch projection system of claim 1, wherein the light source and the image capturer are disposed at two opposite sides relative to the micromirror device.

* * * * *